United States Patent
McGee

(10) Patent No.: US 12,200,120 B2
(45) Date of Patent: Jan. 14, 2025

(54) NETWORK ARRANGEMENT FOR SECURE USE OF A PRIVATE KEY REMOTELY ACCESSED THROUGH AN OPEN NETWORK

(71) Applicant: Tactical Lighting Systems, Addison, IL (US)

(72) Inventor: James P. McGee, Chicago, IL (US)

(73) Assignee: Tactical Lighting Systems, Addison, IL (US)

( * ) Notice: Subject to any disclaimer, the term of this patent is extended or adjusted under 35 U.S.C. 154(b) by 171 days.

(21) Appl. No.: 17/715,786

(22) Filed: Apr. 7, 2022

(65) Prior Publication Data

US 2022/0329412 A1    Oct. 13, 2022

Related U.S. Application Data

(60) Provisional application No. 63/172,359, filed on Apr. 8, 2021.

(51) Int. Cl.
*H04L 29/06* (2006.01)
*H04L 9/08* (2006.01)
*H04L 9/30* (2006.01)

(52) U.S. Cl.
CPC ............... *H04L 9/088* (2013.01); *H04L 9/30* (2013.01)

(58) Field of Classification Search
None
See application file for complete search history.

(56) References Cited

U.S. PATENT DOCUMENTS

| | | | | |
|---|---|---|---|---|
| 7,387,240 | B2 * | 6/2008 | Ziegler | G07F 7/1041 235/382 |
| 7,584,505 | B2 * | 9/2009 | Mondri | H04L 9/0825 726/13 |
| 7,831,237 | B2 * | 11/2010 | Passarella | H04W 12/06 713/153 |
| 9,613,220 | B2 * | 4/2017 | O'Hare | H04L 9/0894 |
| 9,887,975 | B1 * | 2/2018 | Gifford | H04W 12/0431 |
| 2015/0229471 | A1 * | 8/2015 | Nair | H04L 9/0891 713/171 |
| 2016/0072787 | A1 * | 3/2016 | Balabine | H04L 63/12 726/6 |
| 2018/0359103 | A1 * | 12/2018 | Geupel | H04L 9/3273 |

* cited by examiner

*Primary Examiner* — Maung T Lwin
(74) *Attorney, Agent, or Firm* — Leydig, Voit & Mayer, Ltd.

(57) ABSTRACT

Carrying out, over a network infrastructure, secure execution of cryptographic operations using a public/private key pair is described, wherein the private key is permanently stored on a second computing device that is remote to and accessible to the first computing device through an open network. The method includes establishing a secure connection over the open network between the first computing device and the second computing device, sending a file via the secure connection over the open network to the second computing device and instructing the second computing device to: encrypt or decrypt the file with a private key, of the public/private key pair, that is stored on the second computing device; and send the encrypted or decrypted file to the first computing device via the secure connection over the open network. The encrypted or decrypted file is then received over the open network from the second computing device.

20 Claims, 6 Drawing Sheets

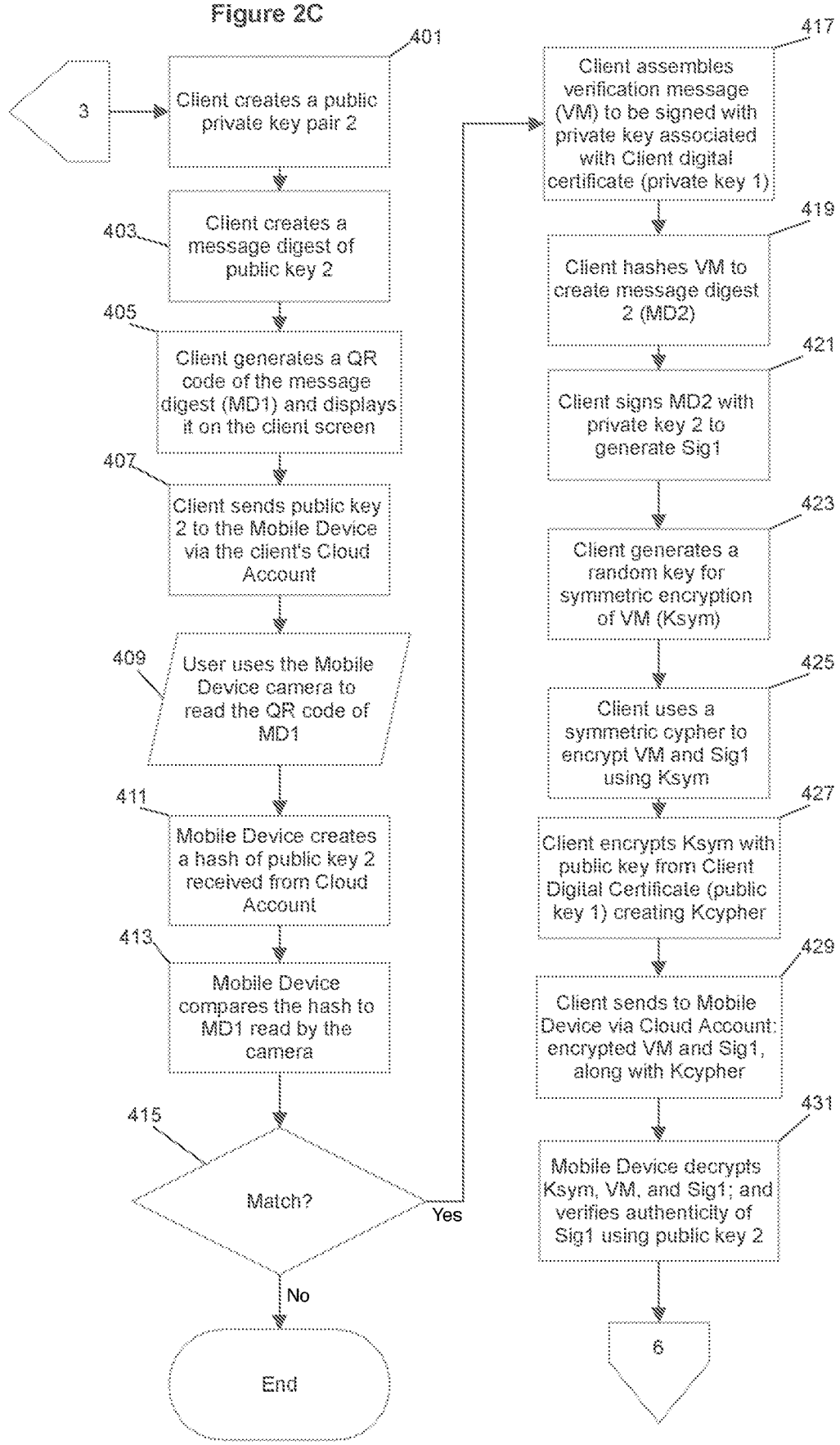

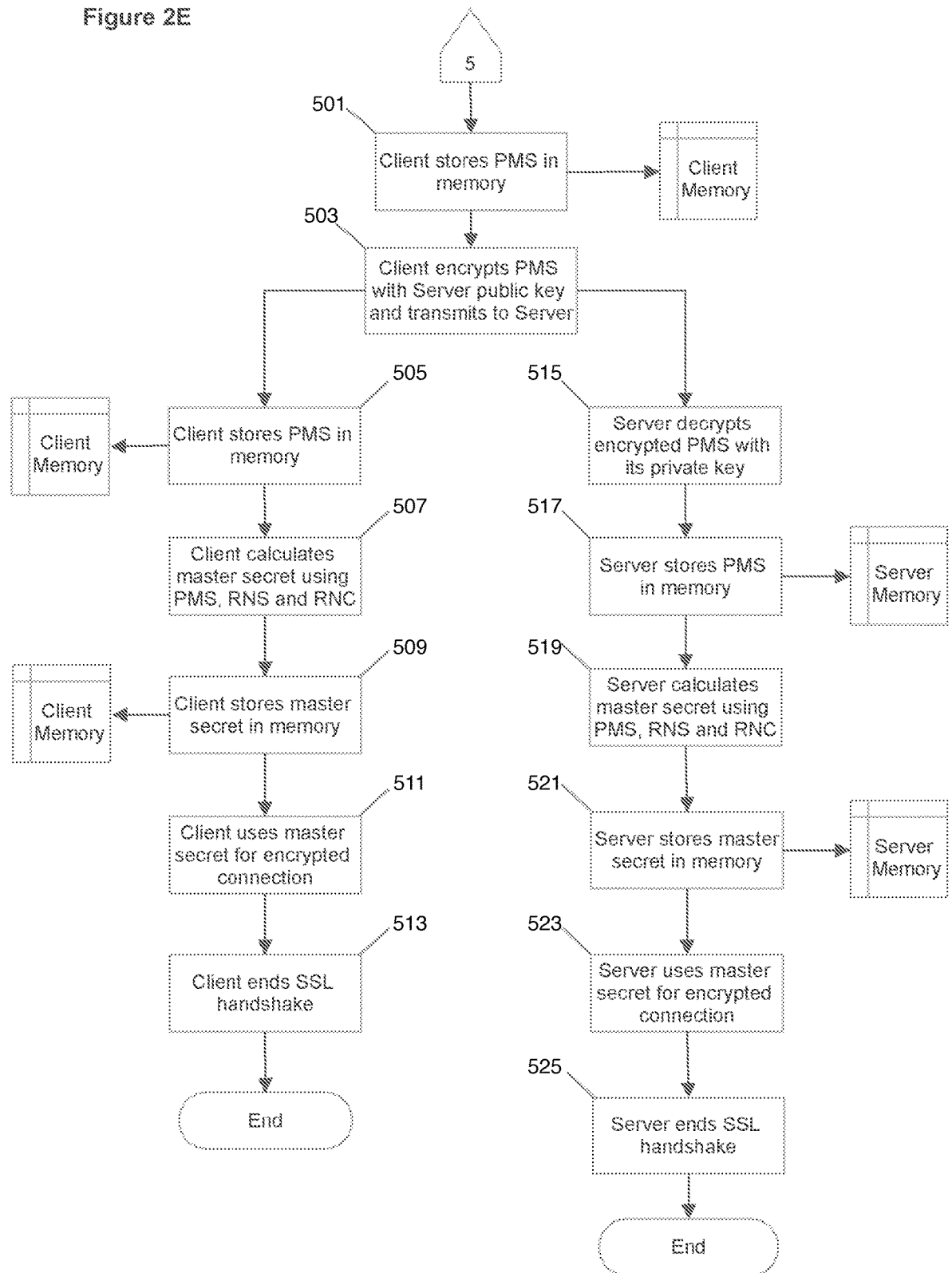

NETWORK ARRANGEMENT FOR SECURE USE OF A PRIVATE KEY REMOTELY ACCESSED THROUGH AN OPEN NETWORK

CROSS-REFERENCE TO RELATED APPLICATIONS

This patent application claims the benefit of U.S. Provisional Patent Application No. 63/172,359, filed Apr. 8, 2021, entitled "NETWORK ARRANGEMENT FOR SECURE USE OF A PRIVATE KEY REMOTELY ACCESSED THROUGH AN OPEN NETWORK", which is expressly incorporated herein by reference in its entirety, including any references therein.

TECHNOLOGICAL AREA

The present disclosure relates generally to secure authentication infrastructures for server computing systems, and more particularly to secure authentication infrastructures implemented in a networked server computer system environment.

BACKGROUND

Cryptographic authenticators (e.g. digital certificates) are widely used to achieve a high authentication assurance level, such as AAL-3 specified by the National Institute of Standards & Technology (NIST) Special Publication (SP) 800-63. Additionally, NIST restricts storage location and access to private keys. Storage location of a private key when using a "software authenticator" is on a user endpoint (e.g. laptop computer) itself. Moreover, when using a private key with a "hardware authenticator", storage is on a hardware authenticator device (e.g. smart card, USB device). Access to the private key when using with a hardware authenticator must be through a direct connection between the user endpoint and the hardware authenticator. NIST specifies software authenticators to discourage, and in any event at least to not facilitate, cloning of a private key onto multiple devices and requires hardware authenticators to not allow private keys to be exportable.

The NIST requirement that private keys be stored only in a single location creates technological challenges (e.g., procedural complexity and usability issues) for implementing high security authentication protocols for identifiable users that rely upon multiple computing devices to access services provided by servers in a highly secure computing environment. For example, when a private key is required to be tied to a particular physical device, a user that installs a digital certificate/private key on a laptop cannot use the same certificate/private key on a smart phone. Using a hardware authenticator device (e.g., smart card, USB fob, etc.) addresses the aforementioned problem of multi-device access by a user. However, supporting hardware authenticator devices introduces the necessity to have the hardware authenticator device physically present when secure access is needed as well as a need to establish a local communication link between the hardware authenticator device and each user device through which a user seeks secure access.

SUMMARY OF THE DISCLOSURE

In accordance with the present disclosure, a method is described herein that is carried out by a first computing device over a network infrastructure, for securely executing cryptographic operations using a public/private key pair, where the private key is permanently stored on a second computing device that is remote to and accessible to the first computing device through an open network. In that regard, the method includes establishing a secure connection over the open network between the first computing device and the second computing device. The method further includes sending a file via the secure connection over the open network to the second computing device and instructing the second computing device to: encrypt or decrypt the file with a private key, of the public/private key pair, that is stored on the second computing device; and send the encrypted or decrypted file to the first computing device via the secure connection over the open network. The method further includes receiving the encrypted or decrypted file over the open network from the second computing device.

The current disclosure is furthermore directed to an infrastructure and operation of the infrastructure to implement a high assurance authentication of an identifiable user. The disclosed infrastructure and method rely upon a user to maintain/possess a "private key" and to prove possession of such key through a cryptographic protocol that is resistant to phishing and data breaches. Additionally, the private key is stored in a single physical location, and yet may be used to authenticate an identifiable user seeking access via multiple computing devices.

Importantly, rather than requiring a direct connection between the hardware authenticator device (e.g. USB, NFC, etc.) and the user endpoint, the presently disclosed authentication method establishes/utilizes a secure cloud-based connection between the private key source and the user endpoint.

Such approach provides at least two benefits—especially if the private keys are stored on a user's mobile phone. First, many users keep their mobile phones with them at all times, so there is no need for such a user to carry another device. Second, since most modern computing devices have continuous connectivity to the Internet, so there is no need to establish connectivity between an authenticator and a computing device.

Accordingly, an infrastructure and method of operation of the infrastructure are described that enable high assurance authentication by a server of the identity of a user on a client computing device through use of a user's cryptographic credentials that are stored on a separate remote computing device (e.g. user's smart phone) and accessed by the client device through an open network.

The disclosed infrastructure and method provide a high assurance level authentication mechanism by providing protections against phishing activities and data breaches.

The disclosed infrastructure and method improve usability over existing methods. To avoid compromising security, in accordance with the present disclosure a private key used in high assurance authentication methods is stored in only a single location. Implementing a high assurance software authenticator generally involves storing/installing a private key on a computing device that is to be operated as the user end point. Such approach can create problems for individuals that intend to use multiple computing devices to access a secure service.

Another existing approach involves storing the private key on a hardware authenticator (e.g. smart card, USB device, etc.) that is directly connected to the computing device of the user. This method allows for use on multiple computing devices but requires a user to have the cryptographic authenticator physically present and requires establishment of a direct connection (e.g. USB, Bluetooth, NFC) between it and the user's computing device.

The disclosed infrastructure and method improve usability over existing methods. They store the private key in a single location, a mobile computing device of the user, and enable usage of the private key by other computing devices through a secure connection over an open network such as the internet.

In that regard, the present disclosure is directed to a first computing device including a processor and a non-transitory computer-readable medium. The computer-readable medium includes computer-executable instructions, that, when executed by the processor, cause the first computing device to carry out a method over a network infrastructure, for securely executing cryptographic operations using a public/private key pair, wherein the private key is permanently stored on a second computing device that is remote to and accessible to the first computing device through an open network. The method carried out by the first computing device includes establishing a secure connection over the open network between the first computing device and the second computing device. The method further includes sending a file via the secure connection over the open network to the second computing device and instructing the second computing device to: encrypt or decrypt the file with a private key, of the public/private key pair, that is stored on the second computing device; and send the encrypted or decrypted file to the first computing device via the secure connection over the open network. The method further includes receiving the encrypted or decrypted file over the open network from the second computing device. Additionally, the disclosure is directed to the method carried out by the first computing device described herein above.

The infrastructure and method of operation may be applied to other uses of digital certificates and public/private key pairs including encryption and digital signing.

BRIEF DESCRIPTION OF THE DRAWINGS

While the appended claims set forth the features of the present invention with particularity, the invention and its advantages are best understood from the following detailed description taken in conjunction with the accompanying drawings, of which:

FIGS. 2A-E are parts of a flowchart summarizing operation of the configured infrastructure of FIG. 1 for providing a server with high assurance authentication of the identity of a user on a client computing device where the user's credentials are stored on a separate remote computing device and accessed by the client device through an open network in accordance with the present disclosure.

DETAILED DESCRIPTION

A networked server-based system infrastructure (see FIG. 1) and method (see FIGS. 2A, 2B, 2C, 2D and 2E) described herein provide a networked server system having an enhanced level of security by enabling easy to use, high assurance authentication of a user's identity. In accordance with the present disclosure, a user operating on a client computing device, invokes and completes an authentication procedure using a cryptographic authenticator, wherein a private key associated with the cryptographic authenticator for the user is stored on a remote mobile computing device, and wherein the cryptographic authenticator is accessed by the client computing device through an open network such as the Internet.

Figure 1:
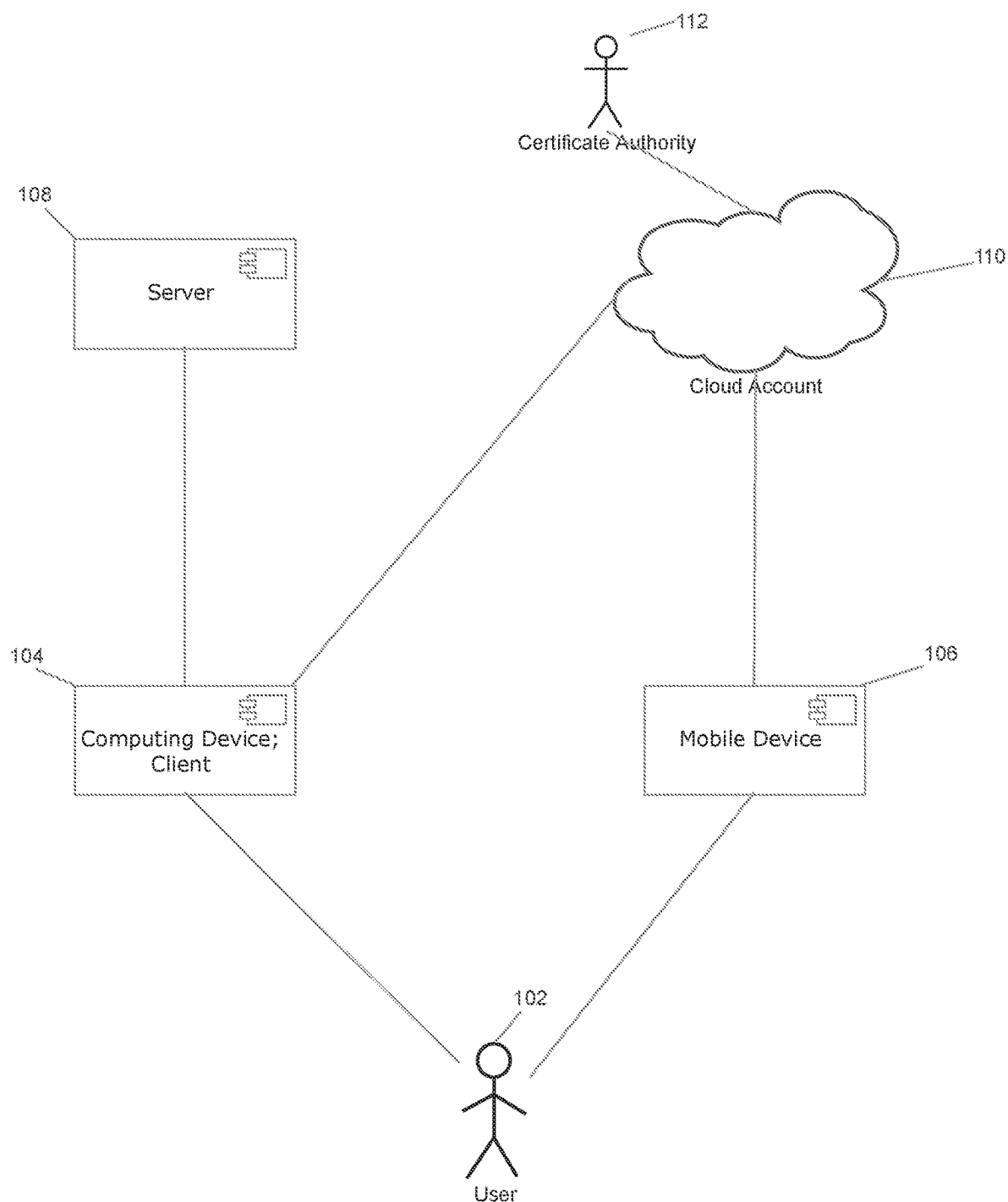
FIG. 1 is a schematic drawing of an exemplary networked infrastructure incorporating data elements and executable instructions performed by computer systems.

Turning to FIG. 1, a server 108 requires authentication of a user 102 seeking access to protected services/assets provided by the server 108, via a client computing device 104. In accordance with the disclosure, the user 102 is also in physical possession of a mobile computing device 106 at the time of seeking access, via the client computing device 104, to a service running on the server 108. Moreover, the user 102 previously was assigned a digital certificate that is digitally signed by a certificate authority 112 and stored in a cloud account 110 of the user. In accordance with the illustrative example provided herein, the digital certificate and an associated private key are both stored on the mobile computing device 106. A second copy of the digital certificate of the user 102 is stored in the cloud account 110 of the user 102.

Having described a general network environment for implementing a high assurance level authentication procedure, attention is directed to a flowchart (divided between FIGS. 2A-E) summarizing, in a detailed step-by-step manner, an illustrative example of a method for authenticating the user 102 seeking to access a secure asset (e.g. the server 108) via a physical device (e.g. the client computing device 104) that does not physically have/possess a private key for authenticating the user 102 to the server 108.

Figure 2A:
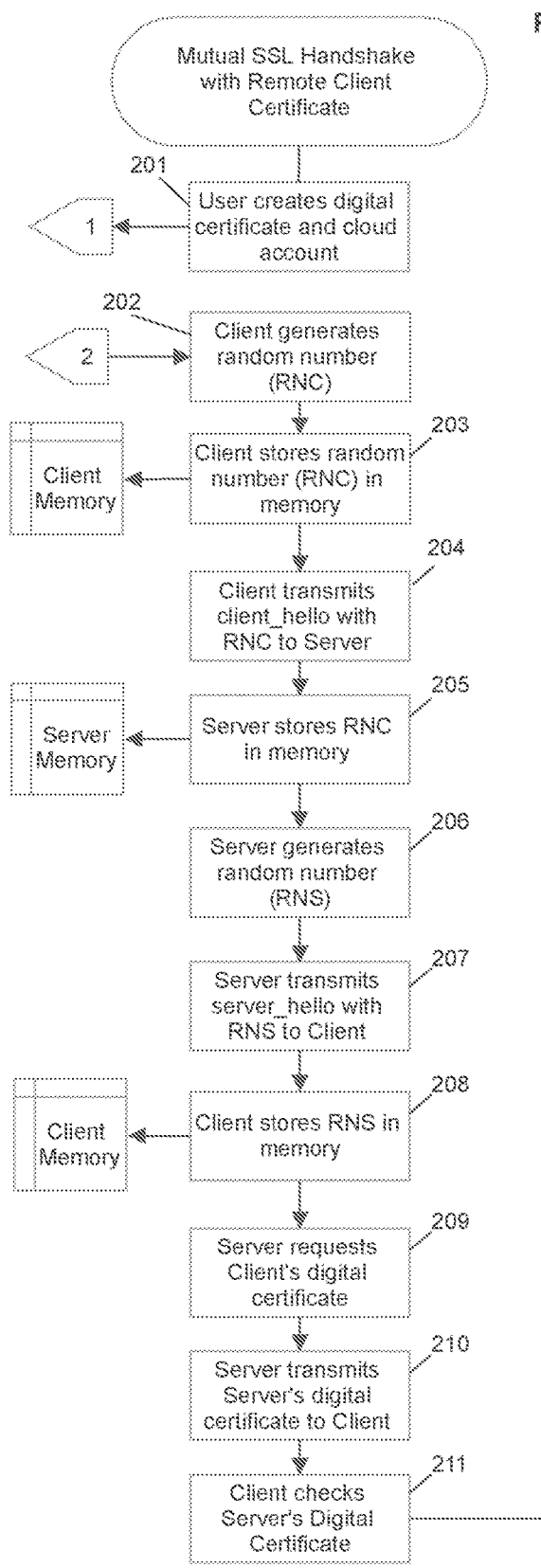
Figure 2A:
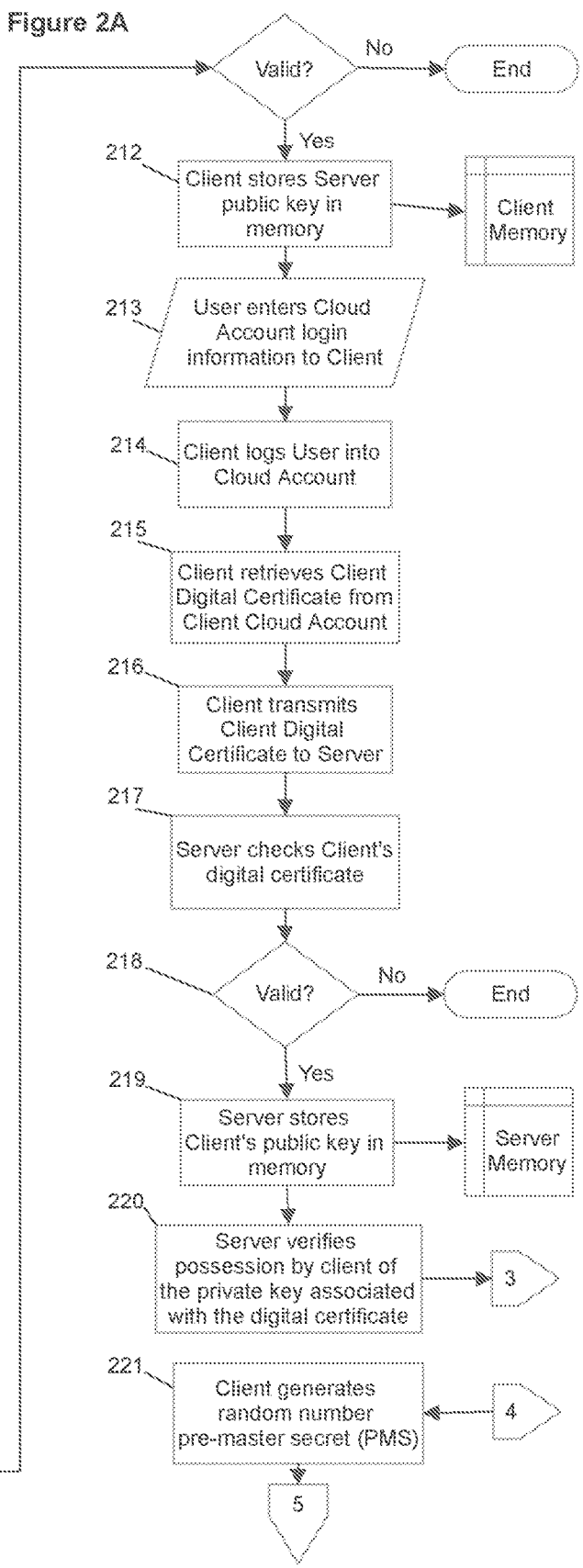

Turning to FIG. 2A, during 201 the user 102 to creates a digital certificate and cloud account. The details of operation 201 are provided, by way of a detailed example summarized in FIG. 2B.

Figure 2B:
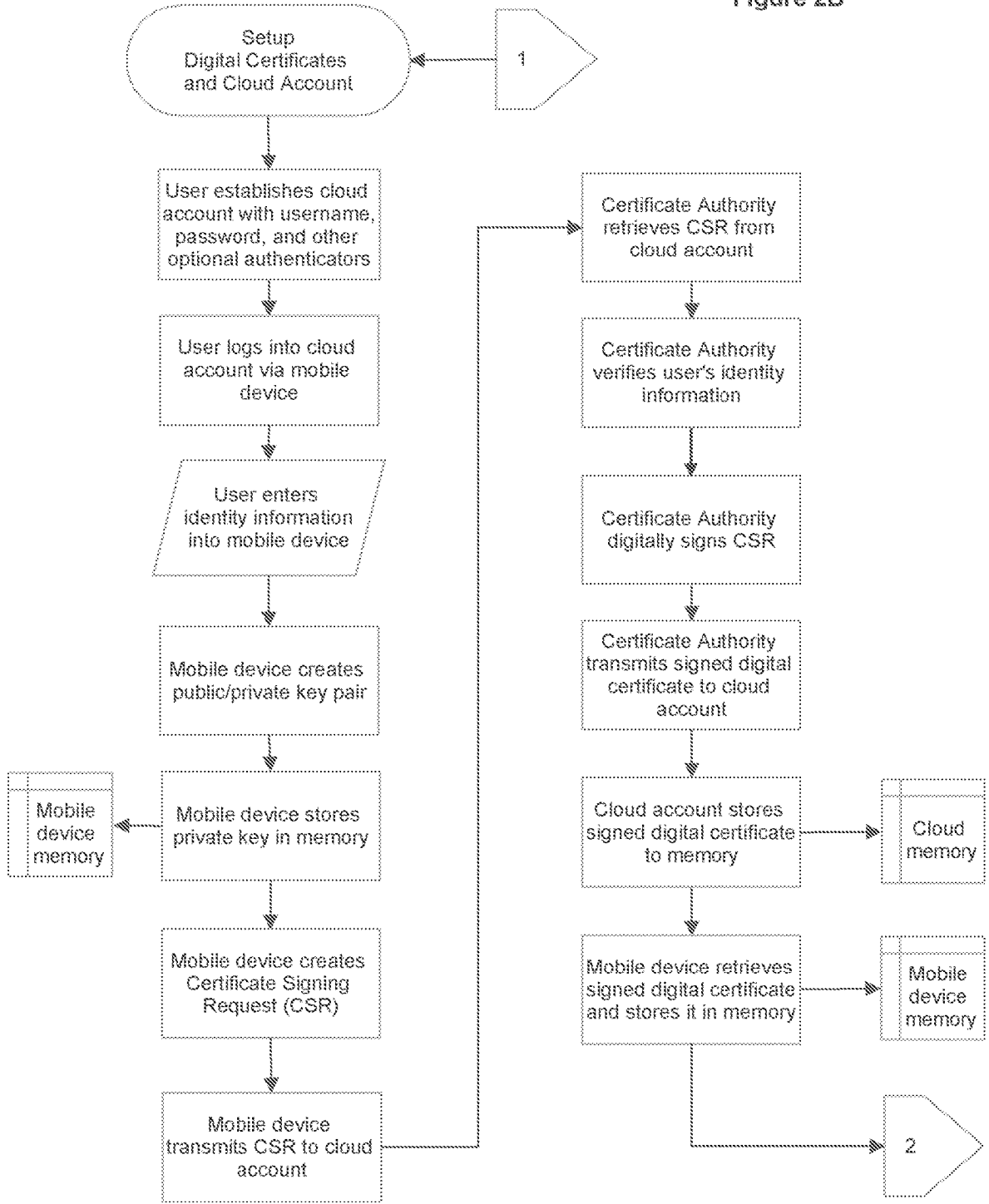

In general, the set of operations set forth in FIG. 2B provide a detailed example of an exemplary operation, including procedures for the user 102 to generate a certificate signing request (CSR), transmit the CSR to a certificate authority, receive the signed digital certificate, and store the signed digital certificate and associated private key on the mobile computing device 106 of the user 102, and to store the digital certificate in the cloud account 110 of the user 102.

Returning to FIG. 2A, the operations set forth during 202-212 are illustrative of procedures and operations carried out to establish a secure socket layer (SSL) handshake with two-way authentication using a set of client/server certificates.

Thereafter, during 213 through 216, an illustrative process is summarized whereby the client computing device 104 retrieves the digital certificate of the user 102 from the cloud account 110—as opposed to retrieving the certificate from memory on the client computing device 104 or from a hardware authenticator (e.g. a smart card, USB fob, etc.) directly connected to the client computing device 104. After the client computing device 104 has retrieved the digital certificate from the cloud account 110, a conventional SSL handshake with two-way authentication process is carried out as summarized, by way of example, in steps 217 through 219.

Thereafter, with continued reference to FIG. 2A, during 220 the server 108 verifies possession, by the user 102, of the private key associated with the digital certificate retrieved by the client computing device 104 from the cloud account 110.

In known authentication procedures, 220 involves either: (1) a cryptographic operation being performed on the client computing device 104 using the associated private key, whereby said private key is stored on the client computing device 104, or (2) through a cryptographic operation performed on a hardware authenticator having a direct local connection to the client computing device 104. However, in accordance with the present disclosure, the private key is stored on and never leaves the mobile computing device 106, and during 220 cryptographic operations are performed on the mobile computing device 106, which is connected to the user's computing device through any communication link, typically wireless and associated with a public network, such the Internet.

Turning to FIG. 2C a further section of the provided flowchart summarizes an exemplary process for securely completing 220. The illustrative procedure in FIG. 2C includes establishing a secure connection between the client computing device 104 and the mobile computing device 106 of the user over any of a variety of communication links/connection, including an open network. Once the secure connection is established, cryptographic operations are performed by the mobile computing device 106 with necessary information flowing over the secure network connection with the client computing device 104 seeking authentication to gain secure access to a service provided by the server 108.

In order to support secure communication between the client computing device 104 and the mobile computing device 106, the client computing device 104 creates a public/private key pair during 401. The client computing device 104 creates a message digest of the public key during 403. The client computing device 104 generates a QR code of the message digest and displays it on the client computing device 104's screen during 405. The QR code ensures that the public key has not been modified when it is transmitted to the mobile computing device 106. The client computing device 104 sends the public key (created during operation 401) to the cloud account 110 and the mobile computing device 106 retrieves the public key from the cloud account 110 during 407. During 409 the user captures/decodes, using a camera on the mobile computing device 106 camera, the QR code of the message digest created during 405. Thereafter, the mobile computing device 106 creates a hash of the public key received from the Cloud Account 110 during 411. During 413/415, the mobile computing device 106 compares the hash to a message digest read by the camera. If the message digest and hash match, then the public key is assumed to be validly created by client computing device 104 and transmitted to mobile device without being modified or tampered.

During 417, the client computing device 104 assembles a verification message (VM) that will be signed by the mobile computing device 106 with the private key associated with the digital certificate transmitted to server during 216. The signed verification message is used by the server 108 to verify that user 102 has possession of the private key. During 419 the client computing device 104 hashes the VM to create message digest of it (MD2). During 421, the client computing device 104 signs the MD2 message digest with the private key created during 401 to generate Sig1. The client computing device 104 generates a random key for symmetric encryption of the VM (Ksym) during 423. During 425, the client computing device 104 uses a symmetric cypher to encrypt VM and Sig1 using Ksym. During 427, the client computing device 104 encrypts the Ksym with the public key from the digital certificate obtained during 215, thereby creating a Kcypher. The client computing device 104, during 429, sends to Mobile Device via Cloud Account the encrypted VM, encrypted Sig1 and Kcypher.

At this point, the mobile computing device 106 receives the encrypted VM, encrypted Sig1 and Kcypher from the Cloud Account 110. Using the private key associated with the digital certificate described in step 215, the mobile computing device 106 decrypts the Kcypher to obtain Ksym. During 431, the mobile computing device 106: decrypts the VM and the Sig1 using the Ksym, and verifies authenticity of the Sig1 using the public key received during 407.

Figure 2D:
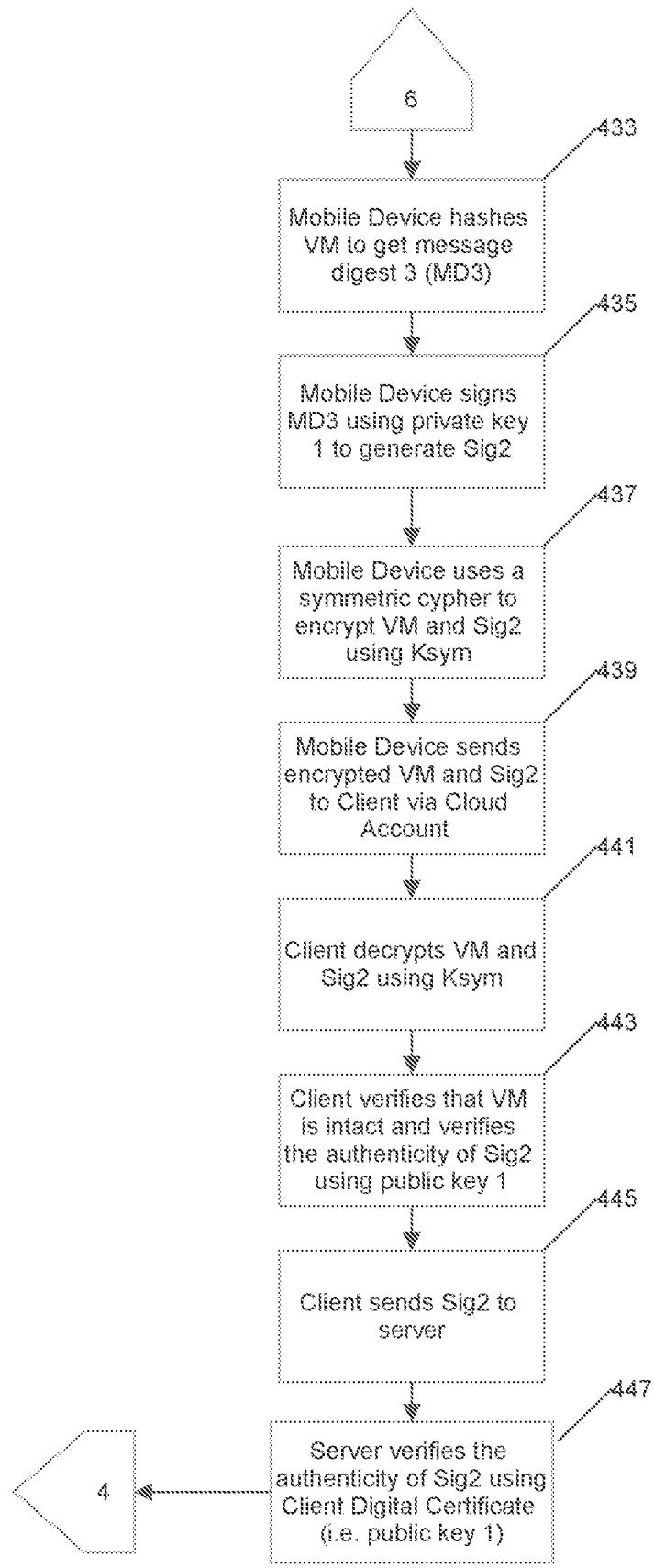

Continuing with the description at FIG. 2D, during 433 the mobile computing device 106 hashes the VM to obtain a message digest 3 (MD3). During 435, the mobile computing device 106 signs the MD3 using the private key associated with the digital certificate described during 215 to generate a Sig2.

The mobile computing device 106, during 437, uses a symmetric cypher to encrypt the VM and the Sig2 using the Ksym. During 439, the mobile computing device 106 sends the encrypted VM and the Sig2 to the client computing device 104 via the Cloud Account 110. The client computing device 104, during 441, decrypts the VM and the Sig2 using the Ksym. During 443, the Client computing device verifies the VM is intact and verifies the authenticity of the Sig2 using the public key from the digital certificate described during 215. The client computing device 104, during 445, sends the Sig2 to the server 108.

During 447, the server 108 verifies the authenticity of the Sig2 using the Digital Certificate of the client computing device 104 that was received during step 216. The server 108, by verifying the authenticity of the Sig2 is thus verifying the User 102 has possession of the private key and thus completes the operation 220 described herein above.

The client computing device 104 and the server 108 thereafter execute customary operations to establish an SSL handshake, with two-way authentication using certificates, during 221 of FIG. 2A, and further detailed in steps 501 through 525 in FIG. 2E.

While the present disclosure provides a particular use of an exemplary private key authentication procedure, the disclosed method applies to other uses of private key authentication arrangements (e.g. encryption, digital signing, etc.) as well as other network environments and user devices through which a user seeks authenticated access to a service.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method, carried out by a first computing device over a network infrastructure, for participating in completing cryptographically secured transactions with a server, using a first public/private key pair, wherein a first public key of the first public/private key pair will be used by the server and the first private key of the first public/private key pair is currently stored on a second computing device that is accessible to the first computing device through an open network, the method comprising:
    providing a simultaneous physical presence, in a vicinity of a user, of both the first computing device and the second computing device;
    establishing, during the providing the simultaneous physical presence, a secure connection over the open network between the first computing device and the second computing device by performing the following:
        generating, by the first computing device, a second public/private key pair, wherein a second public key of the second public/private key pair is provided to the second computing device;
        generating, by the first computing device, a message digest of a second public key of the second public/private key pair;
        presenting, by the first computing device via a display interface, a code value corresponding to the message digest to the user;
        transferring, using an action performed by the user, the code value corresponding to the message digest from the first computing device to the second computing device; and
        using, by the second computing device, the message digest to authenticate the second public key provided to the second computing device in association with the generating a second public/private key pair;
    sending, by the first computing device to the second computing device via the secure connection over the open network, a message requiring cryptographic processing using the first private key, wherein the message causes the second computing device to:
        perform a cryptographic operation on contents of the message using the first private key to render a cryptographically processed message; and
        send the cryptographically processed message to the first computing device via the secure connection over the open network; and
    receiving the cryptographically processed message over the open network from the second computing device; and
    providing the cryptographically processed message to the server.

2. The method of claim 1, wherein the cryptographically secured transactions are performed to establish a secure connection over the open network between the server and the first computing device.

3. The method of claim 1, wherein the cryptographically secured transactions are performed to establish a two-way secure socket layer (SSL) handshake between the first computing device and a server.

4. The method of claim 1, wherein the cryptographically secured transactions are performed to digitally sign a file that is stored on the first computing device.

5. The method of claim 1, wherein the cryptographically secured transactions are performed to encrypt a file stored on the first computing device, and wherein the file comprises an encryption key.

6. The method of claim 1, wherein the cryptographically secured transactions are performed to enable the first computing device to decrypt a file that stored on the first computing device, and wherein the file comprises an encryption key.

7. The method of claim 1, wherein the cryptographically secured transactions are performed to enable the second device, using the private key on the second computing device, to create a shared secret using a public key that is provided by the first computing device, and
    wherein the method further comprises receiving the shared secret, by the first computing device from the second computing device via the secure connection over the open network.

8. The method of claim 1, wherein the first private key is a key type taken from the group consisting of:
    an RSA key; and
    an elliptic curve cryptography (ECC) key.

9. The method of claim 1, wherein the message requiring cryptographic processing using the first private key is a verification message issued by the server.

10. The method of claim 1, wherein the code value is presented by the first computing device in a Quick Response (QR) code format.

11. A first computing device including:
    a processor; and
    a non-transitory computer-readable medium including computer-executable instructions, that, when executed by the processor, cause the first computing device to carry out a method over a network infrastructure, for participating in completing cryptographically secured transactions with a server, using a first public/private key pair, wherein a first public key of the first public/private key pair will be used by the server and the first private key of the first public/private key pair is currently stored on a second computing device that is accessible to the first computing device through an open network, and wherein the method comprises:
        providing a simultaneous physical presence, in a vicinity of a user, of both the first computing device and the second computing device;
        establishing, during the providing the simultaneous physical presence, a secure connection over the open network between the first computing device and the second computing device by performing the following:

generating, by the first computing device, a second public/private key pair, wherein a second public key of the second public/private key pair is provided to the second computing device;

generating, by the first computing device, a message digest of a second public key of the second public/private key pair;

presenting, by the first computing device via a display interface, a code value corresponding to the message digest to the user;

transferring, using an action performed by the user, the code value corresponding to the message digest from the first computing device to the second computing device; and using, by the second computing device, the message digest to authenticate the second public key provided to the second computing device in association with the generating a second public/private key pair;

sending, by the first computing device to the second computing device via the secure connection over the open network, a message requiring cryptographic processing using the first private key, wherein the message causes the second computing device to:

perform a cryptographic operation on contents of the message using the first private key to render a cryptographically processed message; and send the cryptographically processed message to the first computing device via the secure connection over the open network; and receiving the cryptographically processed message over the open network from the second computing device; and providing the cryptographically processed message to the server.

12. The first computing device of claim 11, wherein the cryptographically secured transactions are performed to establish a secure connection over the open network between the server and the first computing device.

13. The first computing device of claim 11, wherein the cryptographically secured transactions are performed to establish a two-way secure socket layer (SSL) handshake between the first computing device and a server.

14. The first computing device of claim 11, wherein the cryptographically secured transactions are performed to digitally sign a file that is stored on the first computing device.

15. The first computing device of claim 11, wherein the cryptographically secured transactions are performed to encrypt a file stored on the first computing device, and wherein the file comprises an encryption key.

16. The first computing device of claim 11, wherein the cryptographically secured transactions are performed to enable the first computing device to decrypt a file that stored on the first computing device, and wherein the file comprises an encryption key.

17. The first computing device of claim 11, wherein the cryptographically secured transactions are performed to enable the second device, using the second private key on the second computing device, to create a shared secret using a public key that is provided by the first computing device, and wherein the method further comprises receiving the shared secret, by the first computing device from the second computing device via the secure connection over the open network.

18. The first computing device of claim 11, wherein the private key is a key type taken from the group consisting of:
an RSA key; and
an elliptic curve cryptography (ECC) key.

19. The computing device of claim 11, wherein the message requiring cryptographic processing using the first private key is a verification message issued by the server.

20. The computing device of claim 11, wherein the code value is presented by the first computing device in a Quick Response (QR) code format; and wherein, during the transferring the code value corresponding to the message digest from the first computing device to the second computing device, the action performed by the user comprises presenting a QR code image, corresponding to the message digest, to a camera of the second computing device.

* * * * *